US008082159B1

(12) United States Patent
    Stafford et al.

(10) Patent No.: US 8,082,159 B1
(45) Date of Patent: Dec. 20, 2011

(54) METHOD AND SYSTEMS FOR ROUTING ITEMS TO RESOURCES

(75) Inventors: Mark Stafford, West Valley City, UT (US); David C. Annesley-DeWinter, Issaquah, WA (US); Ryan Hauert, Murray, UT (US); Cameron C. Liljenquist, Salt Lake City, UT (US)

(73) Assignee: Extend Health, Inc., Burlingame, CA (US)

( * ) Notice: Subject to any disclaimer, the term of this patent is extended or adjusted under 35 U.S.C. 154(b) by 411 days.

(21) Appl. No.: 12/497,616

(22) Filed: Jul. 3, 2009

Related U.S. Application Data

(60) Provisional application No. 61/078,199, filed on Jul. 3, 2008.

(51) Int. Cl.
*G06Q 10/00* (2006.01)
*G06F 17/15* (2006.01)
*G06F 17/00* (2006.01)

(52) U.S. Cl. ............................ 705/1.1; 708/422; 706/55

(58) Field of Classification Search .................. 705/7.11, 705/7.12, 7.36, 1.1; 379/265.12, 265.13, 379/266.01, 266.02, 269, 309; 707/723; 708/422, 426, 5, 813; 706/20, 21, 22, 25, 706/41

See application file for complete search history.

(56) References Cited

U.S. PATENT DOCUMENTS

| | | | | |
|---|---|---|---|---|
| 5,825,869 A | * | 10/1998 | Brooks et al. | 379/265.12 |
| 6,088,441 A | | 7/2000 | Flockhart | |
| 6,408,066 B1 | | 6/2002 | Andruska | |
| 7,644,057 B2 | * | 1/2010 | Nelken et al. | 706/55 |
| 7,991,764 B2 | * | 8/2011 | Rathod | 707/713 |

* cited by examiner

*Primary Examiner* — Igor Borissov
(74) *Attorney, Agent, or Firm* — Kilpatrick Townsend & Stockton LLP

(57) ABSTRACT

Methods, systems, and computer-program products for routing items to resources are disclosed. Potential matches between items and resources are generated and scored according to one or more match-factor criterion. An initial assignment of potential matches is made to a Match Tracker Set, and a Set of Global conflicts is created representing resources that are not matched by the members of the initial Match Tracker set. One or more augmented versions of the Match Tracker Set are created to resolve conflicts between the Match Tracker Set and the Global Conflicts Set. Items are routed to the resources based on the matches listed in an augmented version of the Match Tracker Set.

20 Claims, 8 Drawing Sheets

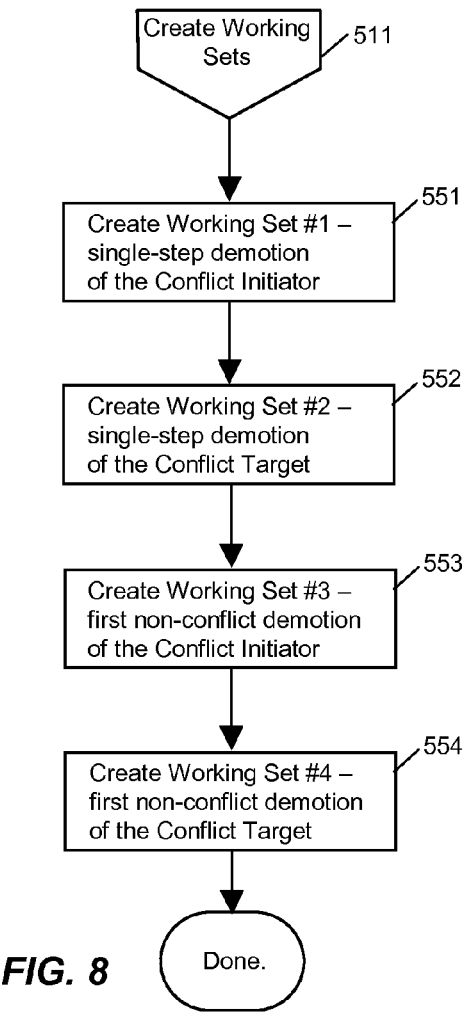

FIG. 8

Resources: P (Phil), L (Loren), B (Bob)
Items:     2, 3, 4
Refined Match Tracker Set: P3 and B2
Global Conflicts Set: L3

Sorted Resource Groups –
| P | L | B | (base score) |
|---|---|---|---|
| P3 (8) | L3 (9) | B2 (13) | |
| P2 (6) | L2 (7) | B3 (10) | |
| P4 (0.1) | L4 (1) | B4 (2) | |

Sorted Item Groups –
| 2 | 3 | (base score difference) |
|---|---|---|
| B2 (11) | P3 (7.9) | |
| | L3 (8) | |

FIG. 9

First Starting Set is (B2 P3 L3)  Branch Loss=0  Recursion Level=0  LBL=High number
Total Base Scores (TBS) for Match Tracker before resolving conflict - 21
Total Base Scores (TBS) for the First Starting Set is 30
L3 (Loren) is Initiator, P3 (Phil) is target

|  |  |  |  |  | Total Loss | Loss | TBS | Conflict? |  |
|---|---|---|---|---|---|---|---|---|---|
| WS #1 | Target | B2 | P2 | L3 | 2 | 2 | 28 | Yes | Phil is demoted down one PM |
| WS #2 | Initiator | B2 | P3 | L2 | 2 | 2 | 28 | Yes | Loren demoted down one PM |
| WS #3 | Target NC | B2 | P4 | L3 | 7.9 | 7.9 | 22.1 | No | Phil is demoted down to first N/C PM |
| WS #4 | Initiator NC | B2 | P3 | L4 | 8 | 8 | 22 | No | Loren is demoted down to first N/C PM |

Dominant Set is (B2 P4 L3) LBL=7.9 because 7.9 is less than 8
Both Working Sets #1 and #2 are conflicted and are pursued in next level of recursion since their losses do not exceed the LBL.

METHOD AND SYSTEMS FOR ROUTING ITEMS TO RESOURCES

CROSS-REFERENCES TO RELATED APPLICATIONS

This application claims benefit under 35 USC 119(e) of U.S. Provisional Patent Application No. 61/078,199, filed Jul. 3, 2008, entitled "METHODS AND SYSTEMS FOR MAXIMIZING MATCH COMPLEMENTS," the content of which is incorporated herein by reference in its entirety for all purposes.

BACKGROUND OF THE INVENTION

There is often a need to match objects from one group to objects of another group for a variety of purposes. For example, in many customer-service call centers, there is a need to match calling customers with representatives who can answer customer questions or resolve customer complaints. Another example is matching lecturers to lecture topics or lectures venues. Often, there is a desire to incorporate one or more criteria in the matching process in order to seek the best overall matching of customers to representatives, or lecturers to topics, but the task is too difficult when a large number of objects are involved.

BRIEF SUMMARY OF THE INVENTION

Methods, systems, and computer-program products for routing between object sets, such as routing items to resources are disclosed. Potential matches between items and resources are generated and scored according to one or more match-factor criteria. An initial assignment of potential matches is made to a Match Tracker Set, and a Set of Global Conflicts is created representing resources that are not matched by the members of the initial Match Tracker set. One or more augmented versions of the Match Tracker Set are created to resolve conflicts between the Match Tracker Set and the Global Conflicts Set. Items are routed to the resources based on the matches listed in an augmented version of the Match Tracker Set.

These inventions and other inventions of the present application, and additional embodiments thereof, are described in the Detailed Description with reference to the Figures. In the Figures, like numerals may reference like elements and descriptions of some elements may not be repeated.

BRIEF DESCRIPTION OF THE DRAWINGS

FIGS. 3-8 illustrate exemplary embodiments of various processes of the exemplary embodiment illustrated in FIG. 1.

FIGS. 9-10 illustrate various sets and parameters for an exemplary routing example according to an embodiments of the present invention.

DETAILED DESCRIPTION OF THE INVENTION

Figure 1:
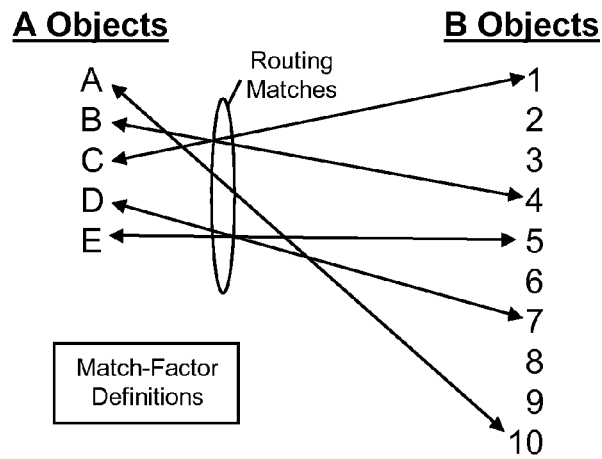
FIG. 1 illustrates a general matching task undertaken by embodiments of the present invention.

FIG. 1 illustrates a general routing task undertaken by embodiments of the present invention where the members of a group of "A Objects" are to be routed (e.g., matched) on a one-to-one basis with the members of a group of "B objects", guided by one or more match-factor definitions to guide the matching process. Either one of these two groups may represent a plurality of items (such as customers, callers, incoming or outgoing telephone lines, projects, tasks, or other tangible items) and the other of the two groups may represent a plurality of resources (such as people, customer-service agents, automated-service agents, outgoing or incoming telephone lines, project resources, lecture venues, or other tangible resources), where the items are to be routed to the resources. In one view, a match-factor definition provides a rating of the suitability of a potential routing match of two members from the two object groups based on one or more criteria. As an example, "A Objects" may represent service agents that answer questions for customer callers, who may be represented as "B Objects," and a match-factor definition may, for example, rate the experience of an "A Object" member at answering questions in an area needed by a "B Object" member. Another match-factor definition may, for example, rate a potential routing match based on the amount of time that a "B Object" member has been in the queue waiting to speak to a service agent (an "A Object"). A match-factor definition may also consider conditions that are general to some or all of the "A Objects" and/or some or all of the "B Objects." Such a condition may be, for example, the average hold time in a contact center. The match-factor definitions for a particular potential match may be combined to provide an overall rating of the suitability of the match based on all of the criteria.

Figure 2:
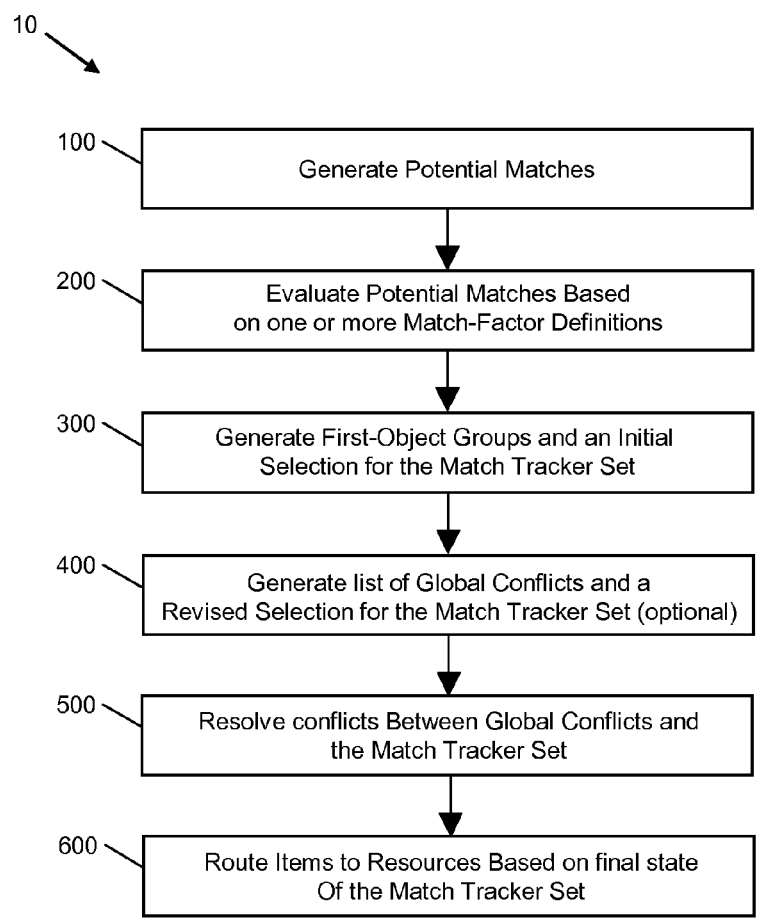
FIG. 2 illustrates an exemplary method of generating a set of matches according to the present invention.

FIG. 2 illustrates an exemplary method 10 of generating a set of routing matches according to the present invention. Method 10 comprises processes 100-600, and begins at process 100. Process 100 generates a set of potential matches between the groups of objects, each potential match having a member from the "A Objects" group and a member from the "B Objects" group. The set of potential matches preferably comprises every possible combination of objects from the two groups. For example, if "A Objects" has 5 members and "B Objects" has 10 members, the set of potential matches has 50 members. Method 10 proceeds to process 200, which evaluates each potential match against one or more match-factor definitions, and generates a base score for the potential match. The match-factor definitions may be configured so that a higher base score is generated when a potential match is deemed to be a better choice for the overall set of matches between object groups.

Method 10 proceeds to process 300, which takes the evaluated potential matches and sorts them according to the members of the "A Objects" to generate a plurality of First-Object Groups. In the example illustrated in FIG. 1, there are five members in the "A Objects" group; so there will be five First-Object Groups, each with ten members since each "A Object" member has a potential match with each of the ten members of the "B Object" group. Within each First-Object Group, the potential matches are sorted by base score in descending order so that the potential member at the top of the First-Object Group has the highest base score in the First-Object Group. Next, a Match Tracker Set is defined and assigned an initial set of potential matches from the top members of the First-Object Groups. During processing, the Match Tracker holds a set of potential matches that are estimated to be the best overall matches between the two object groups in view of the match-factor definitions, and its membership will be refined and augmented to resolve conflicts in processes 400 and 500. For the initial assignment of potential matches to the Match Tracker set, the top potential matches of the First-Object Groups are placed in the Match Tracker, except when two or more top matches are matched to the same member from the "B Objects", also called the Second Objects. In the latter situation, only one of the top matches is placed in the Match Tracker, and the others may be placed in a Side Set. The number of potential matches in the Side Set is indicative of the number of potential conflicts that will be resolved in process 500 since each was excluded from the Match Tracker because it conflicted with another potential match having the same "B Object" member. For every member in the Side Set, a member from the "A Objects" does not appear in a potential match in the initial assignment of the Match Tracker. The conflict resolution process seeks to reassign the unused "A Object" to an unused "B Object" and assign that potential match to the Match Tracker set, or seeks to replace a current member of the Match Tracker set with another potential match that will allow a potential match with the unused "A Object" to be included in the Match Tracker Set. Thus, the members in the Side Set may be viewed as initial conflicts that will be resolved by the conflict resolution process 500. Process 400 optionally generates a refined selection of the Match Tracker set, for the reasons described below, and some members of the Side Set may be exchanged with members of the Match Tracker set prior to conflict resolution. If a Side Set member is exchanged with a member on the Match Tracker, it will no longer be an initial conflict.

The conflict resolution process 500 will effectively seek to find a replacement match for each conflicted match, where the replacement match: (1) has another "B Object" that can be matched to the "A Object" of the conflicted match, (2) does not conflict with the Match Tracker set, and (3) can maintain or increase the total of the base scores in the Match Tracker set when added to the Match Tracker set. To find such a replacement match, the conflict resolution process 500 will also look at replacing a member of the Match Tracker set with another replacement match if the sum of the base scores of the two replacement matches exceeds the base score of the replaced member. The inventors have found that this process can be facilitated by undertaking the optional refinement selection of process 400. This process effectively determines a replacement loss for each member in the Match Tracker set and each member in the Side Set, and exchanges a member of the Match Tracker with a member of the Side Set having the same "B object" if the Side Set member has a lower replacement cost. This will initially make the costs of considering replacement matches for the conflict during the conflict resolution process less expensive.

Accordingly, as an optional but preferred action, method 10 may proceed to process 400, which generates a refined selection of potential matches for the Match Tracker prior to the conflict resolution process 500. Process 400 takes the top potential matches identified by process 300 and sorts them according to the members of the "B Objects" to generate a plurality of Second-Object Groups. Accordingly, all the members of the initial Match Tracker Set and the Side Set are distributed among the Second-Object Groups. The potential matches in each Second-Object Group have the same "B Object" (second object) since they are sorted by that criterion, but have different "A Objects" (first objects). It is not uncommon for a Second-Object Group to have no members or only one member. Process 400 generates the revised selection for the Match Tracker by evaluating the Second-Object Groups. If a Second-Object Group has only one member, process 400 adds it to the revised selection for the Match Tracker Set. If a Second-Object Group has two or more members, process 400 estimates the replacement cost of each member, and adds the member with the least replacement cost to the revised selection for the Match Tracker Set. To determine a replacement cost of a selected member, process 400 locates the potential match in the First-Object Group that has the selected member. As stated above, the members in the First-Object Group are sorted by base score in descending order. The selected member will be at the top of the Group because it was a top match. Process 400 goes down the Group in descending order looking for the next potential match that is not in conflict with the initial selection of the Match Tracker Set. The replacement cost is generated as the base score of the selected member minus the base score of the first potential replacement match with no conflicts. If no potential replacement match can be found, the replacement cost is generated as the base score of the selected member. Members of the Second-Object Groups that are not selected for the revised selection of the Match Tracker Set are placed in a Global Conflicts Set.

Method 10 then proceeds to the conflict resolution process 500, where it selects a global conflict from the Global Conflicts Set to process, constructs several Working Sets that include the global conflict and possible replacements for it and for one or more members of the Match Tracker Set, and determines if one of the Working Sets can be a viable replacement to the Match Tracker. A Working set is deemed to be viable if it has no conflicts between its members and can add a potential match having the "A Object" member of the selected global conflict without lowering the total of the base scores in the Match Tracker Set. The construction of Working Sets may, as described below, involve a recursive process where the working sets are constructed and evaluated according to a search tree. All of the global conflicts in the Global Conflicts Set are processed in this matter, and they or a replacement match are added to the Match Tracker Set, if possible.

After conflict resolution process 500, the final state of the Match Tracker Set is operable to route item to resource with a near optimal utilization of the resources for the given items. The final state of the Match Tracker Set is such that execution of the selected matches will result in near-optimal utilization of resources and near-optimal handling of items. Method 10 then proceeds to routing process 600 to perform routing in a manner desired by the user. First, if needed, the routing process correlates the match results in the Match Tracker Set from the Object-A and Object-B format to the particular Items and Resources. In one embodiment, process 600 may store routing information for the Items and Resources in a computer-readable medium, where that information includes information for the routing of at least one Item to one Resource based on the final state of the Match Tracker Set. In another embodiment, process 600 may direct an electrical component to configure electrical connections between Items and Resources (such as callers and call handlers) in relation to the final state of the Match Tracker Set. In a call center environment, or other applications where the interaction between a matched item and resource is relatively short (e.g., less than a half-hour), the routing of an item to a resource is terminated, which frees up the resource. At that point, method 10 may be re-run, or just processes 200-500 or processes 300-500 may be re-run, to find a new item to route to the free-up resource; also, method 10 may be run using just the free-up resource and the unused items.

More detailed descriptions of processes 100-600 are now given in the context of an example where items, such as customers, are being matched to resources. For the sake of illustration, and without loss of generality, the resources will take the role of the above-described "A Objects," and the items will take the role of the above-described "B Objects." However, the assignments may be reversed in the practice of the present invention.

Figure 3:
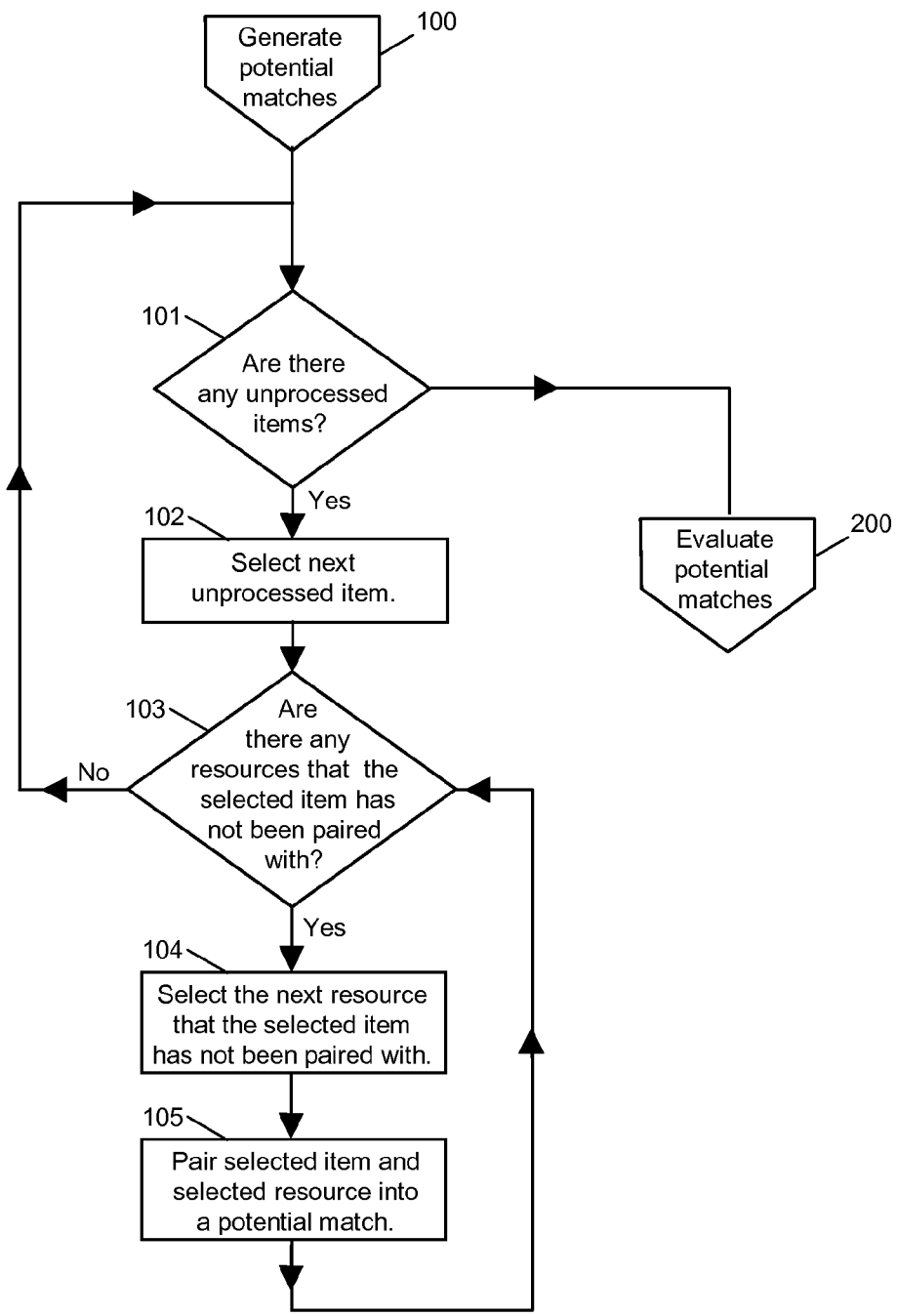

FIG. 3 illustrates an exemplary embodiment of process 100 of generating a set of potential matches. Potential matches may be created by exhaustively combining each item with each resource. If there are M items and N resources, there can be up to M×N potential matches. It is not necessary to give consideration to the availability or current match state of either the items or the resources. The use of the match-factor definitions, described below in greater detail, can be used to give such consideration. The exemplary embodiment of process 100 comprises actions 101-105, and interconnections between these actions as shown in the figure and as described below. The exemplary embodiment iterates through the list of items and generates a potential match of each item with each resource. (It may be appreciated that another embodiment of process 100 may iterate through the list of resources and generate a potential match of each resource with each item.) The items in the item list are initially designated as unprocessed. Actions 101-103 iterate through the unprocessed items, generating a set of potential matches for each item of the iteration. At action 101, process 100 determines if there are any unprocessed items left in the list. If so, it selects one of the unprocessed items for processing at action 102. At action 103, process 100 performs another iteration loop with the selected item in conjunction with actions 104 and 105 to generate potential matches between the selected item and all of the resources. At the start of this iteration, all of the resources are initially designated as being unpaired with the selected item. At action 104, process 100 selects an unpaired resource from the list of unpaired resources. At action 105, process 100 generates a potential match between the selected item and the selected resource, and returns to action 103. At action 103, process 100 determines if there are any unpaired resources left, and if so, reiterates actions 104-105. If not, action returns to action 101 to determine if there are any unprocessed items left in the item list. If so, process 100 reiterates actions 102-105; if not, it moves on to process 200 to evaluate the potential matches.

Figure 4:
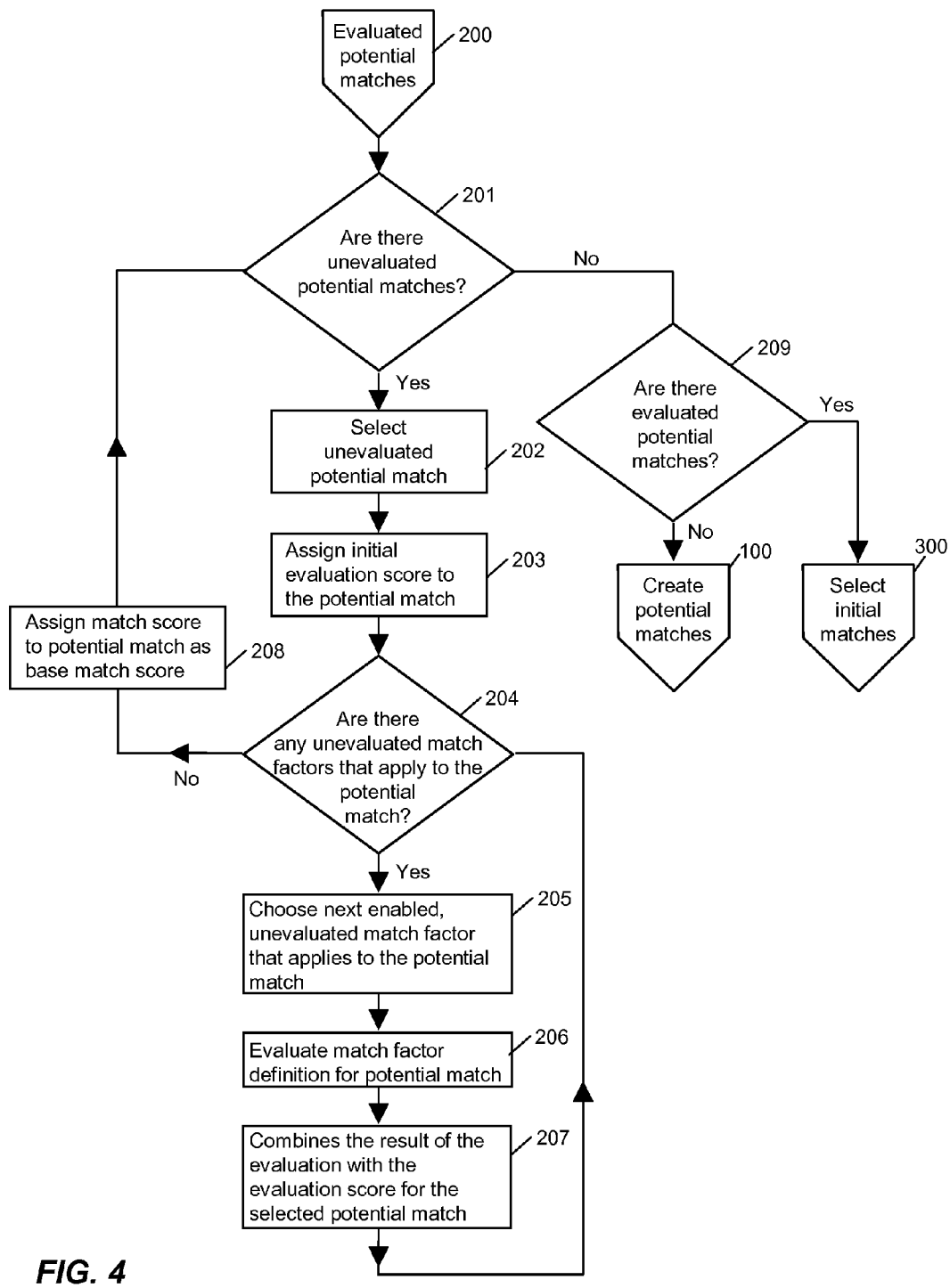

FIG. 4 illustrates an exemplary embodiment of process 200 of evaluating the potential matches. Process 200 generates a base score for each match based upon one or more criteria called match-factor definitions, or match factors for short. Various pieces of information about each item and resource (such as location, request nature, skills, etc.) may be provided to process 200 to assist in evaluating the match-factor definitions. Examples are provided below. Process 200 may include an action to obtain, inquire, or import in such information. The base score of a potential match provides a measure of the priority the potential match should be given in assembling a set of final matches between the items and the resources. The higher the base score, the more likely it is that the potential match will be selected for the set of final matches. The exemplary embodiment of process 200 comprises actions 201-209, and the interconnections between the actions as shown in the figure and as described below. The exemplary process iterates through the list of potential matches and generates a base score for each potential match from the set of match factors. The potential matches are organized in a list and are initially designated as unevaluated. Actions 201-204 iterate through the unevaluated potential matches, evaluating each potential match against the set of one or more match factors to generate a base score for the potential matches. A base score of a potential match may represent a composition of a plurality of evaluation scores, with each evaluation score being based on the evaluation of the potential match against a corresponding match-factor definition. The evaluation scores for a potential match are aggregated to generate the base score for the potential match. Such aggregation may include may include summation, subtraction, multiplication, division, or a combination thereof.

At action 201, process 200 determines if there are any unevaluated potential matches left in the list. If so, it selects one of the unevaluated potential matches for processing at action 202. At action 203, process 200 associates an initial evaluation having an initial value to potential match. If the evaluation scores for the potential match are to be summed together, this initial evaluation value may be zero. If the evaluation scores for the potential match are to be multiplied together, the initial evaluation value may be any non-zero number, such as 1. At action 204, process 200 performs another iteration loop with the selected potential match in conjunction with actions 205-208 to evaluate the selected potential match against the match-factor definitions and to generate a total evaluation score. At the start of this iteration, all of the match-factor definitions are initially designated as being unevaluated for the potential match. Action 204 determines if there are any unevaluated match-factor definitions that apply to the selected potential match. (A match-factor definition may not be appropriate to apply to a potential match, either because of the resource or the item associated with the potential match, in which case the match-factor definition is skipped.) If action 204 determines that there is an unevaluated match-factor definition that can be applied to the selected potential match, process 200 selects the unevaluated match-factor definition at action 205 and evaluates it for the selected potential match at action 206. Process 200 then proceeds to action 207, where it aggregates the result of the evaluation with the evaluation score for the selected potential match. The result may be combined by adding it to the evaluation score, multiplying the evaluation score by the result, or processed in another manner. In exemplary embodiments, the evaluation score is multiplied by the result. Process 200 thereafter proceeds back to action 204, to see if any more match-factor definitions are to be processed. If not, process 200 proceeds to action 208, where the current value of the evaluation score is assigned as the base score for the selected potential match. From there, process 200 returns to action 201 to determine if there are any more potential matches that need to be processed. If not, process 200 proceeds to action 209, where it confirms that it has built a set of evaluated potential matches with corresponding base scores before proceeding to process 300. If a set of evaluated potential matches has not been built, there is no need for the method to continue; process 200 may terminate or return back to process 100 to generate a new set of potential matches.

Figure 5:
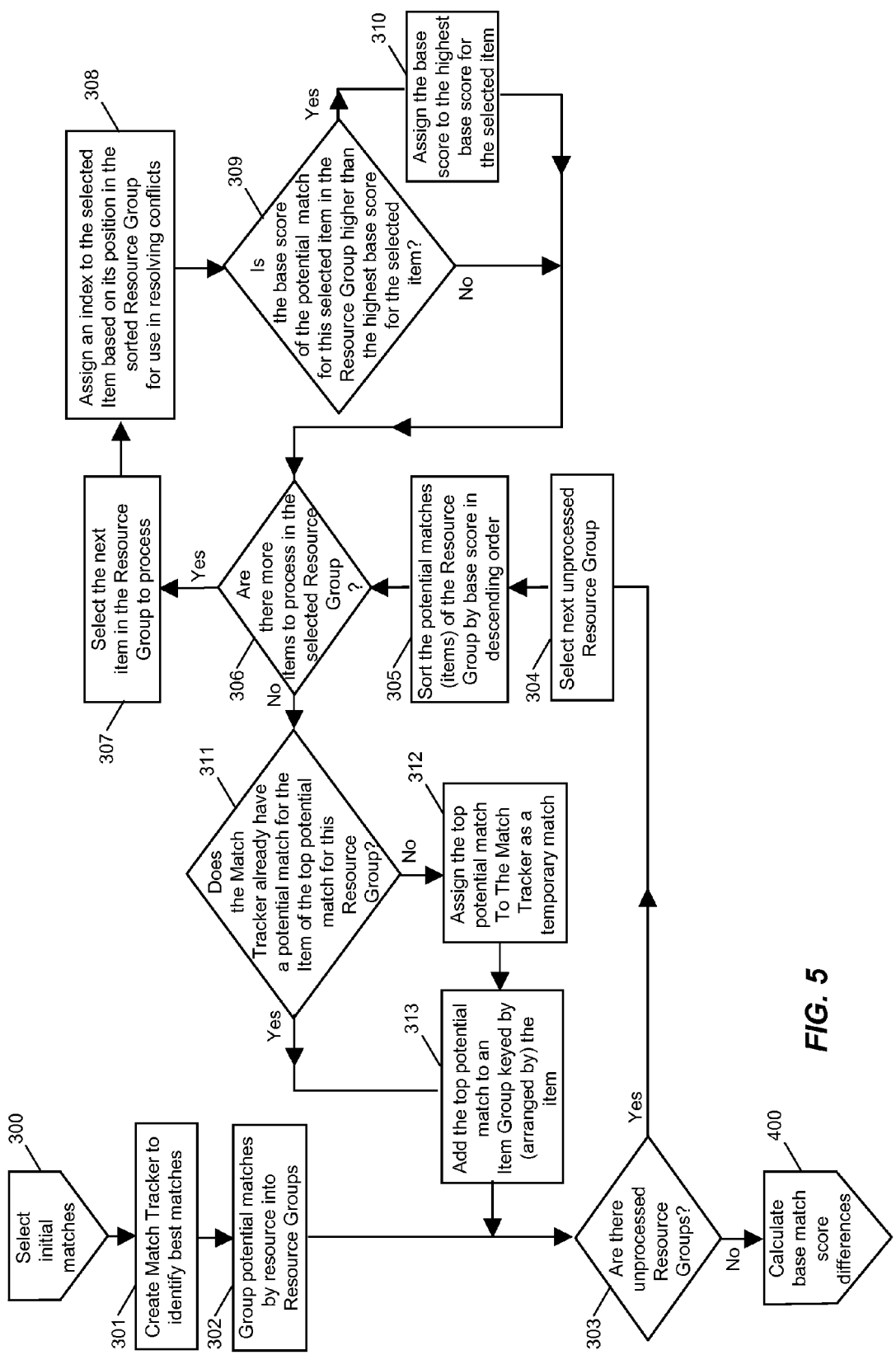

FIG. 5 illustrates an exemplary embodiment of process 300 of generating the First-Object Groups and an initial selection of potential matches for the Match Tracker set. As an ancillary action, process 300 also generates the Second-Object Groups used by process 400. In this embodiment, the First-Object Groups will be called the "Resource Groups" and the Second-Object Groups will be called the "Item Groups," in keeping with the example. The Resource Groups comprise a plurality of groups equal in number to the resources, with each Group being associated to a respective resource. The members of a Resource Group comprise the potential matches (generated by process 100) that are paired to the resource associated with the group. The members (potential matches) of each Resource Group are sorted (action 305) by base score in descending order, and given an index value based on their rank in the descending order (action 308). The Resource Groups and their descending sorted orders are retained and will be used in conflict resolution process 500 to generate the Working Sets. The Item Groups (Second-Object Groups)

track the items that appear in the top positions of the Resource Groups. Each Item Group corresponds to an item, and contains the potential matches for that item that appear at the top positions of the Resource Groups (e.g., they have the highest base scores of the Resource Groups). Because an item might appear at the top positions of two or more Resource Groups, an Item Group may comprise two or more members (potential matches). If this occurs, one or more conflicts is indicated, which will be resolved by process 500. On the other hand, an item may not have a potential match at the top position of a Resource Group, in which case there is no Item Group for such an item.

The exemplary embodiment of process 300 comprises actions 301-313. Process 300 creates the Match Tracker set at action 301, and groups the potential matches (generated by process 100) by resource into the Resource Groups at action 302. Actions 303 and 304 process each of the Resource Groups through actions 305-313. Process 300 sorts the potential matches of a selected Resource Group by base score in descending order at action 305. Actions 306 and 307 then step through each sorted Resource Group to perform some optional actions that can be helpful in some implementations of method 10. Action 308 assigns an index value to the selected potential match based on its position in the sorted Resource Group. The index can be useful in generating the replacement costs for implementations of process 400 and the demotion processes that occur in process 500 by allowing a process to quickly find the potential match in the sorted Resource Group so that replacement match with next lower base score can be quickly found. Actions 309 and 310 track the highest base score given to an item (i.e., an object) across all of the Resources. This information can be useful to some implementations of method 10 which reiterate the method and the information can be used to adjust the parameters of the match-factor definitions. After each Resource Group has been processed by actions 306-310, process 300 examines the top potential match in the processed Resource Group (the potential match with the highest base score) at action 311 to determine whether the Match Tracker Set already has a member for the item of the top potential match. If not, the top match is added to the Match Tracker Set by action 312. In either case, the top match is added to an Item Group (a Second-Object Group) that is arranged by items (keyed by the items) at action 313. One member from each Item Group is effectively selected to be in the initial selection for the Match Tracker Set. The initial selection will be refined in process 400 using the concept of base score differences.

Figure 6:
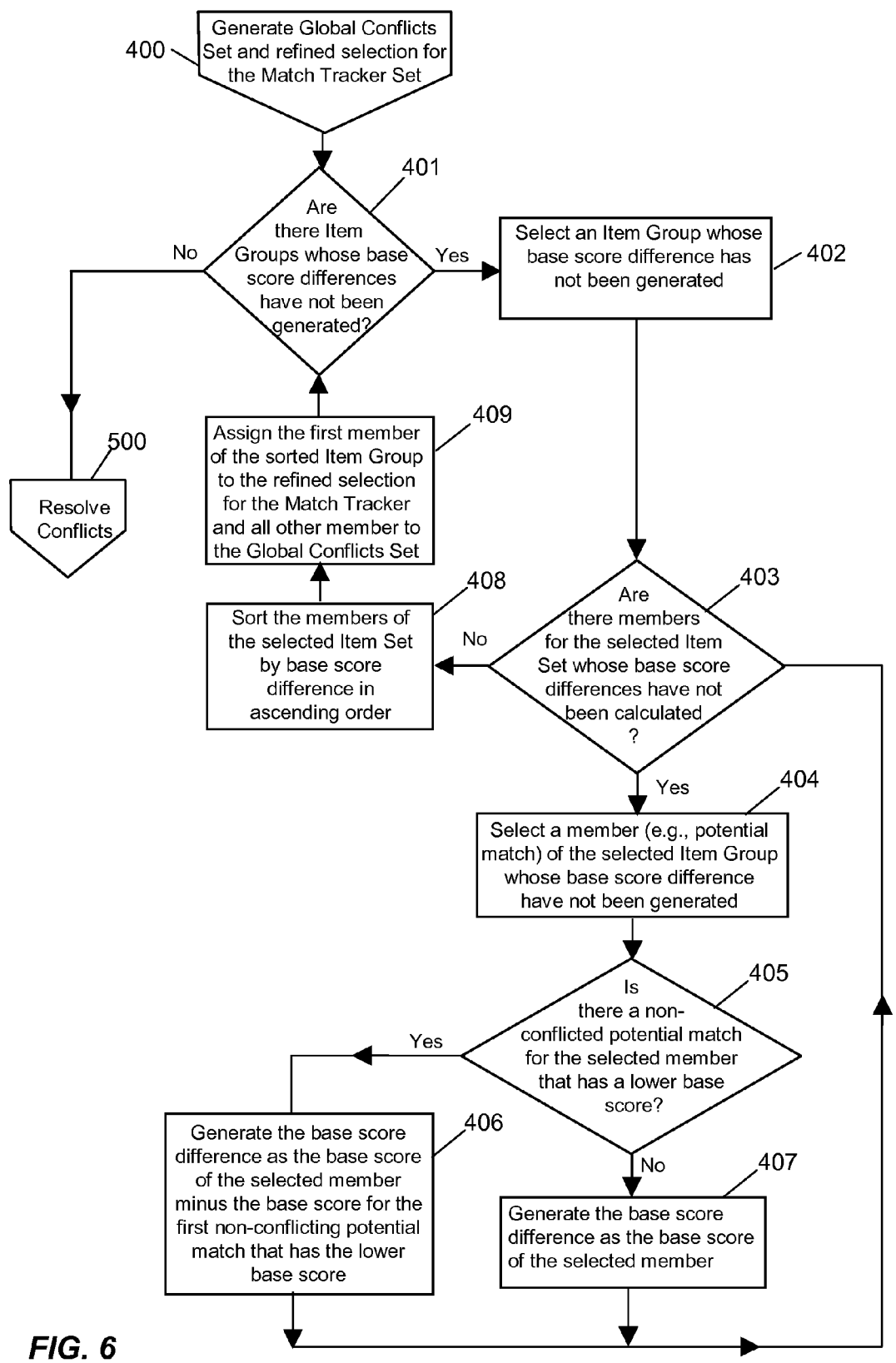

FIG. 6 illustrates an exemplary embodiment of process 400 of generating a Global Conflicts Set, and optionally generating a refined selected for the Match Tracker Set based on the concept of base score difference. If process 400 does not generate a refined selection for the Match Tracker Set, it generates the Global Conflict Set and the above-described Side Set. Otherwise, it generates the revised selection and the Global Conflict Set as described below. As indicated above, if an Item Group (Second-Object Group) has more than two members, one of the members was arbitrarily selected to be in the initial selection of the Match Tracker Set. But that arbitrary selection may not lead to the selection with the highest sum of base scores of matches in the final state of the Match Tracker. We can estimate the best selection and select it by using the concept of base score differences. During the conflict resolution process 500, there is a chance that the member selected from an Item Group will have to be "demoted" from the Match Tracker in order to resolve a conflict. Demotion occurs when the member is replaced by a potential match that has the same Resource as the demoted member, but has a different Item. There are two types of demotion: a conflicted demotion, which occurs when the replacement potential match has a conflict with the Match Tracker Set, and a non-conflicted demotion, which occurs when the replacement potential match does not have a conflict with the Match Tracker Set. The potential loss in total base score caused by a demotion is equal to the base score of the demoted member minus the base score of the replacement potential match. Given an initial selection for the Match Tracker Set (as done by process 300) and the sorted Resource Groups (also done by process 300), the lowest potential loss caused by a non-conflicted demotion for each member of an Item Set can be estimated. This lowest potential loss is called the base score difference for the member of the Item Set, and is equal to the above-described replacement cost. It is currently believed that allocating the member of the Item Set that has the lowest base score difference (lowest replacement cost to a non-conflicted replacement match) to the Match Tracker used by the conflict resolution process 500 will most likely lead to a higher total base score after conflict resolution since the maximum amount of loss caused by potential demotion has been limited to the least amount.

The base score difference of a member of an Item Group (Second-Object Group) may be determined by finding the member in one of the sorted Resource Groups, and then going down that resource group in the direction of decreasing base score until the first potential match is found that does not conflict with the initial selection of the Match Tracker Set or the current selection of the Match Tracker Set. If such a non-conflicting potential match is found, the base score difference is generated as the base score of the member minus the base score of the first-found non-conflicting potential match. If a non-conflicting potential match cannot be found, the base score difference is generated as the base score of the member, which would be the loss associated with removing the member from the Match Tracker Set altogether during conflict-resolution process 500 if it were placed in the Match Tracker Set at the start of process 500.

Referring to FIG. 6, actions 401 and 402 of process 400 iterate through the Item Groups to select and process them. Actions 403 and 404 of process 400 iterate each member of a selected Item Group through actions 404-407 to select a member and generate the base score difference for the selected member. Action 404 selects a member of the selected Item Group. Action 405 finds the selected member in one of the Resource Groups, and then travels down the Resource Group (in the direction of descending base score values) to try to find a potential replacement match in the Resource Group that does not conflict with the initial selection of the Match Tracker Set. If such a potential match is found, action 406 generates the base score difference for the selected member as the base score of the selected member minus the base score of the replacement match. If not, action 407 generates the base score difference for the selected member as the base match score of that member. After the base score differences for the members of the selected Item Group have been generated, action 408 of process 400 sorts the members of the Group by base score difference in ascending order. Action 409 then selects the first (top) member of the sorted Item Group (the one with the lowest base score difference), adds it to the refined selection for the Match Tracker Set (replacing any existing potential match for that Item already on the Match Tracker Set), and adds the remaining members of the sorted Item Group to the Global Conflicts Set. If desired, process 400 may be repeated using the refined selection for the Match Tracker Set in place of the initial selection during actions 405-406. This sorting and selection actions 408 and 409 may be done after all of Item Groups have been processed to generate the base score differences, or may be done after each Item Group has been processed (as is shown in the figure). The benefit of the latter sequencing is that the initial selection of the Match Tracker can be updated to reflect the results of actions 408-409 for the benefit of determining non-conflicting potential matches for the base score differences of the Item Groups that have not yet been processed.

Figure 7:
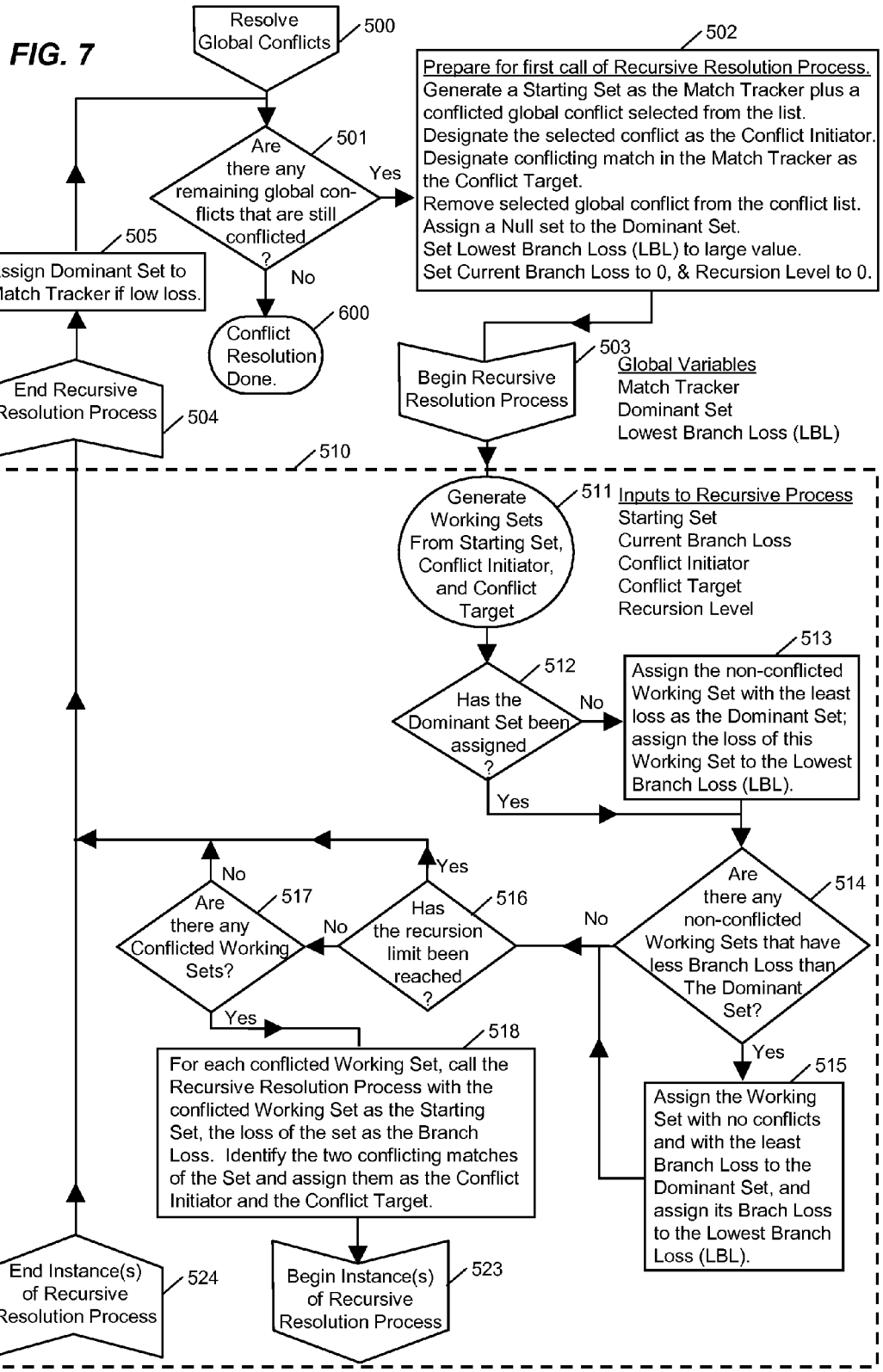

An exemplary process 500 for resolving the Global Conflicts is illustrated in FIG. 7. Process 500 starts with the Match Tracker Set generated by process 400, and examines various ways in which each global conflict in the Global Conflicts Set can be added to the Match Tracker Set by changing some of the existing matches in the Match Tracker Set and/or finding a replacement match for the global conflict. The process starts by generating a Starting Set of matches, which comprises the current list of matches provided by the Match Tracker Set (e.g., the refined selection), plus a global conflict selected from the Global Conflicts Set. The Starting Set has a conflict between the selected global conflict, which we will call the "Conflict Initiator," and one of the matches taken from the Match Tracker, which we will call the "Conflict Target." The Conflict Initiator and the Conflict Target have different resources (different First Objects), but have the same item (same Second Object) being paired to their resources. Process 500 generates several Working Sets of different pairings for the resources so that the above two resources can potentially be paired and matched to different items without being in conflict with other members (matches) of the Match Tracker Set or the Starting Set. Process 500 looks not only at changes to the pairings of the resources associated with the Initiator and Target, but also at changes in the pairings of the resources of other members in the Starting Set to find a way to incorporate the resource of the Conflict Initiator (global conflict) in a manner that would increase the total base score of the existing state of Match Tracker Set more than the base score of the Conflict Target. If successfully found, the Match Tracker Set has one or more of its members replaced with one or more corresponding replacement matches, and is augmented with a new potential match that includes the resource of the Conflict Initiator and increases the total base score of the Match Tracker Set. The modified and augmented state of the Match Tracker Set has a total base score that is the same or greater than the total base score of the prior state of the Match Tracker Set. In some cases, process 500 may obtain an augmented version of the Match Tracker Set with a higher total base score compared to the previous version of the Match Tracker Set by removing a member of the prior version, in which case the augmented version and prior versions has the same number of members.

By way of the Working Sets, process 500 does a search of various changes in the pairings of the resources on the Match Tracker Set by proposing various replacement matches for the Match Tracker Set, but does so in a limited manner that is bounded by a limit on the loss in the total base scores that such replacement matches would have. That is, process 500 will not further process any Working Set (conflicted or non-conflicted) that has more loss than other viable Working Sets. Loss in this case means the value by which the total base score of the Match Tracker Set would have to drop in order to resolve the conflict. This search may be done along a tree structure of branches and nodes using a recursive conflict resolution process, with the depth of the tree being limited by a bound on an amount of loss of the total base scores. An exemplary recursive process is shown in the figure by Recursive Resolution Process 510. In some cases, replacement matches can be made to the existing state of the Match Tracker Set with a loss in the total base scores between the unmodified and modified version of the Match Tracker Set being less than the base score of the Conflict Target, and these replacement matches enable the Conflict Initiator or a potential match containing the resource of the Conflict Initiator (as paired with an unused item) to be added to the Match Tracker Set with a gain in the total base scores of the augmented Match Tracker Set. In some cases this cannot be done, and the Conflict Initiator or a potential match containing the resource of the Conflict Initiator is not added.

Referring to FIG. 7, at action 501, process 500 determines if there are any remaining global conflicts in the Global Conflicts Set that are still in conflict with the current state of the Match Tracker Set. If not, the process 500 moves to routing process 600, where the method finishes by routing the items to the resources. If there are such remaining global conflicts, one is selected and process 500 proceeds to action 502, where it prepares inputs for a first application of the Recursive Resolution Process 510. Many actions are performed at action 502. First, a Starting Set of potential matches (or pairings) for the recursive process to start with is generated. The Starting Set comprises the combination of the potential matches from the Match Tracker Set plus the selected global conflict. The selected global conflict is assigned as the Conflict Initiator, and the match in the Starting Set that conflicts with the global conflict is assigned as the Conflict Target. The selected global conflict is removed from the Global Conflicts Set. Recursive Resolution Process 510 will try to find a replacement for the Starting Set which does not have any conflicts, and it uses a temporary set, called the "Dominant Set," as part of its processing. As the Recursive Resolution Process 510 travels through the nodes and branches of the search tree, it first tries to find a non-conflicted replacement set that has a loss equal to or less than the base score of the Conflict Target. If found, it assigns that replacement set as the Dominant Set, and assigns the set's associated loss in a parameter called the Lowest Branch Loss (or LBL). If, during its traveling of the search tree, process 510 subsequently finds a non-conflicted replacement set with a loss that is less than the current LBL, it assigns the subsequent non-conflicted replacement set to the Dominant Set (replacing the prior Dominant Set) and assigns its loss to the LBL. To prepare for this, the action initially assigns a Null set to the Dominant Set, and assigns a high value to the LBL. The high value may be the total base score, the largest integer value that can be represented by a computer, or other large number.

During its processing, Recursive Resolution Process 510 generates a plurality of Working Sets at each node of the search tree. The Working Sets are generated from a starting set, such as the Starting Set generated at action 502. Each such Working Set comprises a variation of the pairings of the starting set that resolves the initial conflict in the starting set, but has an associated loss that arises from the variation in the pairings. While the variations address the initial conflict, they may introduce a new conflict in one or more of the Working Sets. If it appears feasible, Recursive Resolution Process 510 will try to see if such a new conflict in a Working set can be resolved by introducing a variation of the pairings in that Working Set (actions 516-523 described below). To do this, Recursive Resolution Process 510 executes (e.g., "calls") an instance of itself, with the Working Set assigned to the Starting Set for the called instance. This call creates a new branch of the tree from the prior node to a new node of the tree. At the new node, a group of new Working Sets is generated, with each new Working Set having a variation in the pairings of the prior Working Set, which may be called the "Parent Working Set." When Recursive Resolution Process 510 calls an instance of itself, it passes the loss in the total base score caused by the variations in the Parent Working Set. The passed loss value is called the "Current Branch Loss." For the first execution of Process 510, action step 502 assigns zero to Current Branch Loss. The Current Branch Loss passed to a tree node represents the losses that have been incurred by the variations in pairings that were made to reach the tree node, and the loss for each Working Set at the tree node includes the Current Branch Loss passed to the tree node. The Current Branch Loss increases with the depth of the tree node, and eventually it may exceed the Lowest Branch Loss (LBL). When this happens, Recursive Process 510 discontinues pursuing branches to deeper nodes. In some cases, it is beneficial to limit the depth that Process 510 can reach to a set value. For this, Process 510 may also pass a Recursion Level value to each instance of itself. The instance increments the passed value of Recursion Level, and determines if this value is below the limit before executing further instances of Process 510. For the first execution of Process 510, action step 502 assigns zero to the Recursion Level.

Some or all of the Working Sets at a tree node may be free of conflicts, and their losses are calculated and compared to the LBL to determine if they have a replacement set that can be assigned to the Dominant Set. Loss is calculated by subtracting the base score of the potential match that was introduced as a variant on this Working Set from the base score of the potential match that was replaced. (The indices generated by action 308 of process 300 may be used to speed the calculations of the losses.) On the other hand, some or all of the Working Sets at a tree node may have conflicts, in which case, they may be pursued in branches of the search tree, as described above.

The first execution of Recursive Resolution Process 510 occurs at action 503. This starts the process of traversing the nodes and branches of the search tree, and starts the first execution of Process 510 and the execution of all the instances of Process 510 that are subsequently called. The end of the execution of Process 510 occurs at action 504. If this is the end of the first execution of Process 510, then Process 510 has likely generated a Dominant Set that can be used to resolve the global conflict that was previously selected in action 502. Process 500 moves to action 505 to examine the Dominant Set. If the Dominant Set exists (e.g., it is not the Null Set) and the LBL loss is less than the base score of the Conflict Target identified in action 502, then process 505 assigns the Dominant Set to the Match Tracker Set, and proceeds to action 501 to process another global conflict. If the Dominant Set does not exist (e.g., it is the Null Set) or the LBL loss is equal to or greater than the base score of the Conflict Target identified in action 502, then process 500 makes no changes to the Match Tracker Set, and proceeds to action 501 to process another global conflict. This means that Recursive Resolution Process 510 could not find a viable way to include the global conflict selected in action 502. In this latter case, and as an optional action, process 500 may place this unresolved global conflict into another list, which may be processed again by method 500 after all conflicts in the Global Conflicts Set have been processed. (In some cases, it is possible that processing all of the global conflicts may open up possible resolutions for these unresolved conflicts.)

It is possible that a resolution of the global conflict selected by action 502 will, as a coincidence, resolve a conflict of another global conflict which has not yet been processed by method 500. Since action 501 tests to determine if a global conflict in the list is still in conflict before proceeding to action 502, such a global conflict will not be processed by action 502 and Recursive Resolution Process 510. Thus, at the end of process 500, the Global Conflict Set may contain matches which are no longer in conflict with the final state of the Match Tracker Set. To address this, action 600 may include the action of adding these matches to the Match Tracker Set before routing the items to the resources.

Recursive Resolution Process 510 comprises actions 511-517, 523, and 524, as described below in greater detail. Action 511 generates the Working Sets for the tree node from the Starting Set, the Conflict Initiator, and the Conflict Target. FIG. 8 shows an exemplary process of generating the Working Sets from the Starting Set. In one exemplary implementation, four Working Sets are generated, and the Working Sets are generated such that at least two Working Sets have no conflicts. The Starting Set has two conflicts, the Conflict Initiator and the Conflict Target. Action 551 (FIG. 8) generates the first Working Set as the Starting Set with the Conflict Target replaced by another potential match that has the same resource (same first Object) but a different item (different second object). In this matter, the Conflict Target is demoted down one potential match in the Resource Group, which may be referred to as a single-step demotion of the Conflict Target. Action 551 selects the replacement for the Conflict Target by locating the Conflict Target in the appropriate sorted Resource Group (first Object Group), and selects the next member (potential match) in the Group that is immediately below it. In other words, action 551 selects the potential match in the Resource Group that has the next lowest base score. The replacement potential match may or may not be in conflict with other members of the first Working Set. In a similar manner, action 552 generates the second Working Set as the Starting Set with the Conflict Initiator replaced by another potential match that has the same resource (same first Object) but a different item (different second object). In this matter, the Conflict Initiator is demoted, which may be referred to as a single-step demotion of the Conflict Initiator. Action 552 selects the replacement for the Conflict Initiator by locating the Conflict Initiator in the appropriate sorted Resource Group (first Object Group), and selects the next member (potential match) in the Group that is immediately below it. In other words, action 552 selects the potential match in the Resource Group that has the next lowest base score. The replacement potential match may or may not be in conflict with other members of the first Working Set. (The indices generated by action 308 of process 300 may be used to speed the construction of the Working Sets by quickly locating the Initiator and Target.)

The generation of the first and second Working Sets is illustrated by an example shown in FIGS. 8-10. The example pertains to routing three customers, denoted by 2, 3, and 4, respectively, to three resources: Phil (P), Loren (L), and Bob (B). FIG. 8 shows the resources and items, the sorted Resource Groups listing all of the potential matches with their base scores, the sorted Item Groups listing showing the top matches and their base score differences, the refined Match Tracker Set, and the starting set for the first applications of process 510 and action 511. For visual simplicity, the three exemplary resources are abbreviated as P, L, and B, and the potential matches are abbreviated as a two letter combination of P, L, or B with 2, 3, or 4. Base scores and base score differences are shown in parentheses. The Starting Set is (B2 P3 L3), with L3 being the Conflict Initiator since it was taken from the Global Conflicts Set, and P3 being the Conflict Target since it conflicts L3 for the same customer (3). The first working set is generated by taking the Starting Set and performing a single-step demotion of the Conflict Target: P3. P3 is located in the "P" group of the Resource Groups at the top of the group. The next lower member in the resource group is potential match P2, which is used to replace P3 in the Starting Set to form the first Working Set as (B2 P2 L3). The second working set is generated by taking the Starting Set and performing a single-step demotion of the Conflict Initiator: L3. L3 is located in the "L" group of the Resource Groups at the top of the group. The next lower member in the resource group is potential match L2, which is used to replace L3 in the Starting Set to form the second Working Set as (B2 P3 L2). Both the first and second Working Sets have conflicts, which are explored for resolution in further calls to Recursive Process 511, as described below.

Referring back to FIG. 8, Action 553 generates the third Working Set as the Starting Set with the Conflict Target replaced by another potential match that has the same resource (same first Object) but a different item (different second object) that does not conflict with any other member of the Starting Set. In this matter, the Conflict Target is demoted down to the next lower non-conflicting potential match in the Resource Group that has the Target, which may be referred to as a non-conflicting demotion of the Conflict Target. Action 553 selects the replacement for the Conflict Target by locating the Conflict Target in the sorted Resource Group (first Object Group) that has it, and selects the next member (potential match) in the Group below it that does not have a conflict with the other members of the working set. Referring to FIG. 9, the next non-conflicting potential match in resource group "P" for the Conflict Target P3 is potential match P4, yielding the third working group (B2 P4 L3). In a similar manner, Action 554 generates the fourth Working Set as the Starting Set with the Conflict Initiator replaced by another potential match that has the same resource (same first Object) but a different item (different second object) that does not conflict with any other member of the Starting Set. In this matter, the Conflict Initiator is demoted down to the next lower non-conflicting potential match in the Resource Group that has the Initiator, which may be referred to as a non-conflicting demotion of the Conflict Initiator. Action 554 selects the replacement for the Conflict Initiator by locating the Conflict Initiator in the sorted Resource Group (first Object Group) that has it, and selects the next member (potential match) in the Group below it that does not have a conflict with the other members of the working set. Referring to FIG. 9, the next non-conflicting potential match in resource group "L" for the Conflict Initiator L3 is potential match L4, yielding the fourth working group (B2 P3 L4). FIG. 10 shows the four Working Sets (identified as WS #1-WS #4), along with other pertinent information.

After each Working Set is constructed, the loss associated with it may be computed as part of each of actions 551-554. The loss may be computed by determining the loss due to the difference in base scores of potential matches in the demotion process necessary to create the set plus the Current Branch Loss, which was passed to recursive process 510. The latter holds the sum of the losses that have accumulated along the branches and nodes that lead up to the Working Set. The demotion loss may be generated as the base score of the Conflict Initiator (or Conflict Target) minus the base score of the match that replaced it.

In some cases, particularly in later reiterations of recursive process 510, it may not be possible to perform a single-step demotion or a non-conflicting demotion on the Conflict Initiator or the Conflict Target if the Conflict Initiator or the Conflict Target is at a low position in the Resource Group. Usually, placing a recursion limit on process 510 prevents this from happening. Nonetheless, recursive process 510 may be configured to work with fewer Working Sets if a demotion for a Working Set cannot be constructed, or action 511 may be configured to include a pseudo-match at the end of each Resource Group to a non-existing match that has a zero or negative base score, which will effectively create a high loss for the Working Set and cause other actions in process 510 to not consider the Working Set.

Referring back to FIG. 7, from action 511 of generating the Working Sets, Recursive Resolution Process 510 moves to action 512, where it determines whether a set other than the Null set has been assigned to the Dominant Set. If not, Process 510 moves to action 513, which assigns the non-conflicted Working Set with the least loss as the Dominant Set, and assigns the loss of this set to the LBL. In the example of FIG. 10, this is Working Set #3.

From action 513, or from the "Yes" determination of action 512, Recursive Resolution Process 510 moves to action 514, which determines if there are any non-conflicted Working Sets that have less loss than the Dominant Set (e.g., the LBL). If so, Process 510 moves to action 515, which assigns the Working Set with no conflicts and which has the least loss to the Dominant Set, and assigns its loss to the LBL. This action is for recursions that occur after the Dominant Set has been established.

From action 515, or from the "No" determination of action 514, Recursive Resolution Process 510 moves to action 516, which increments the value of the Recursion Level and determines if it has reached the recursion limit. If so, Process 510 proceeds to action 504 to end its processing and to return to the calling instance of Recursive Resolution Process 510, or to the main part of Process 500 if it was called by Process 500. If the recursion limit has not been reached, Recursive Resolution Process 510 proceeds to action 517, which determines if there are any conflicted Working Sets. If not, Recursive Resolution Process 510 proceeds to action 504 to end its processing and to return to the calling instance of Recursion process 510, or to the main part of Process 500 if it was called by Process 500. If there are any conflicted Working Sets determined by action 517, Recursive Resolution Process 510 proceeds to action 518, where it executes (calls) an instance of itself for each conflicted Working Set that has a loss that is less than the Lowest Branch Loss. If a conflicted Working Set has a loss that is greater than the Lowest Branch Loss, then it is known that further demotions will not provide a viable candidate to replace the Dominant Set, and the Working Set need not be explored. Each conflicted Working Set is given to the corresponding called instance as the Starting Set for the called instance, and the loss for the Working Set is passed to the called instance as the Current Branch Loss. The two conflicts within the Working Set are given to the corresponding called instance of Process 510 as the Conflict Initiator and Conflict Target for the called instance. (A working set could never have more than two conflicted potential matches; the creation of a new conflict spawns the recursion process to deal with the conflict; hence there will never be more than two conflicted potential matches.) Also, the Recursion Level is passed to each called instance. The start of each called instance of Recursive Resolution Process 510 is done by action 523 of the current instance of process 510, which creates a processing branch of process 500 that starts the new instance at action 503. In the example shown in FIG. 10, Working Sets WS#1 and WS#2 have conflicts, and are passed as starting sets to two instances of Process 511 that are recursively called. As indicated above, each call to an instance of Process 510 creates a new branch and node of the search tree. When that processing branch finishes the new instance and any instances that it may have called, it ends the new instance at action 504 and returns to action 524 of the calling instance.

Once all of the called instances for process 510 have ended at action 524, process 510 then proceeds to action 504 to end its processing.

Once Conflict Resolution Process 500 is finished, the final state of the Match Tracker Set is operable to route the Items to the Resources. Method 10 may then proceed to routing process 600 to perform routing in a manner desired by the user. First, if needed, the routing process correlates the match results in the Match Tracker Set from the Object-A and Object-B format to the particular Items and Resources. In one embodiment, process 600 may store routing information for the Items and Resources in a computer-readable medium, where that information includes information for the routing of at least one Item to one Resource based on the final state of the Match Tracker Set. In another embodiment, process 600 may direct an electrical component to configure electrical connections between Items and Resources (such as callers and call handlers) in relation to the final state of the Match Tracker Set.

Figure 11:
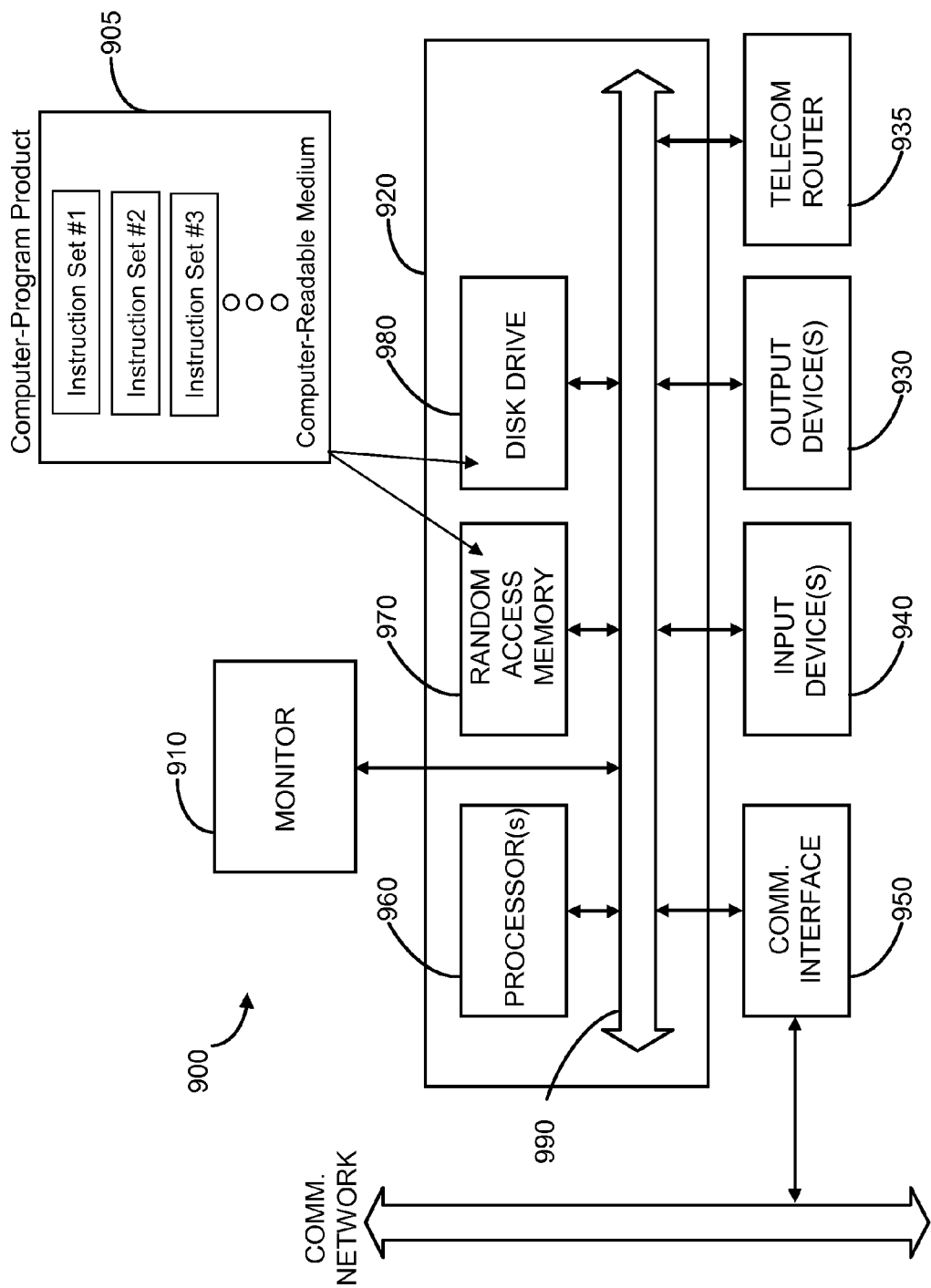
FIG. 11 is a diagram illustrating a computer system that can be used in conjunction with some embodiments of the invention.

The above method and process embodiments may be implemented by computer-program products that direct a computer system to perform the actions of the above-described methods and processes. Each such computer-program product may comprise sets of instructions (codes) embodied on a computer-readable medium that directs the processor of a computer system to perform corresponding sub-actions, actions, and processes. The instructions may be configured to run in sequential order, or in parallel (such as under different processing threads), or in a combination thereof. They may be segregated or intermixed among various code modules, and made be configured to have application-programming interfaces (APIs). FIG. 11 shows a simplified block diagram of a computer system 900 that may incorporate embodiments of the present invention. FIG. 11 is merely illustrative of an embodiment incorporating the present invention and does not limit the scope of the invention as recited in the claims. One of ordinary skill in the art would recognize other variations, modifications, and alternatives. System 900 comprises a computer 920, a monitor 910 coupled to computer 920, one or more additional user output devices 930 (optional) coupled to computer 920, one or more Telecommunication Routers 935 (optional) coupled to computer 920, one or more user input devices 940 (e.g., keyboard, mouse, track ball, touch screen) coupled to computer 920, an optional communications interface 950 coupled to computer 920, a computer-program product 905 stored in a tangible computer-readable memory in computer 920. Computer-program product 905 directs system 900 to perform the sub-actions, actions, and processes of above-described actions, processes and methods. Computer 920 may include one or more processors 960 that communicate with a number of peripheral devices via a bus subsystem 990. These peripheral devices may include user output device(s) 930, user input device(s) 940, communications interface 950, and a storage subsystem, such as random access memory (RAM) 970 and disk drive 980, which are forms of tangible computer-readable memory. Computer-program product 905 may be stored in disk drive 980, or another computer-readable medium accessible to computer 920, and loaded into memory 970. Each processor 960 may comprise a microprocessor, such as a Pentium® or Itanium® microprocessor from Intel, or an Opteron® or AthlonXP® microprocessor from Advanced Micro Devices, Inc, or the like. To support computer-program product 905, computer 920 runs an operating system that handles the communications of product 905 with the above-noted components, as well as the communications between the above-noted components in support of product 905. Exemplary operating systems include Windows®, WindowsXP®, WindowsNT®, or the like from Microsoft Corporation, Solaris® from Sun Microsystems, LINUX, UNIX, and the like.

User input devices 940 may include all possible types of devices and mechanisms for inputting information to computer system 920. These may include a keyboard, a keypad, a touch screen incorporated into the display, audio input devices such as voice recognition systems, microphones, and other types of input devices. In various embodiments, user input devices 940 are typically embodied as a computer mouse, a trackball, a track pad, a joystick, wireless remote, a drawing tablet, a voice command system. User input devices 940 typically allow a user to select objects, icons, text and the like that appear on the monitor 910 via a command such as a click of a button or the like. User output devices 930 include all possible types of devices and mechanisms for outputting information from computer 920. These may include a display (e.g., monitor 910), non-visual displays such as audio output devices, etc. Telecommunications router 935 may include any type of conventional telephone equipment, Internet equipment, or the like that makes connections between phone lines (such as those carrying incoming calls from customers) and customer agents based on routing information provided to it from computer 920.

Communications interface 950 provides an interface to other communication networks and devices, and may serve as an interface for receiving data from and transmitting data to other systems. Embodiments of communications interface 950 typically include an Ethernet card, a modem (telephone, satellite, cable, ISDN), (asynchronous) digital subscriber line (DSL) unit, FireWire interface, USB interface, and the like. For example, communications interface 950 may be coupled to a computer network, to a FireWire bus, or the like. In other embodiments, communications interface 950 may be physically integrated on the motherboard of computer 920, and may be a software program, such as soft DSL, or the like.

RAM 970 and disk drive 980 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMS, DVDs and bar codes, semiconductor memories such as flash memories, read-only-memories (ROMS), battery-backed volatile memories, networked storage devices, and the like. RAM 970 and disk drive 980 may be configured to store the basic programming and data constructs that provide the functionality of various embodiments of the present invention, as described above. Specifically, software instruction sets that provide the functionality of the present invention may be stored in RAM 970 and disk drive 980. These instruction sets may be executed by processor(s) 960. RAM 970 and disk drive 980 may also provide a repository for storing data and data structures used in accordance with the present invention. RAM 970 and disk drive 980 may include a number of memories including a main random access memory (RAM) for storage of instructions and data during program execution and a read-only memory (ROM) in which fixed instructions are stored. RAM 970 and disk drive 980 may include a file storage subsystem providing persistent (non-volatile) storage for program and data files. RAM 970 and disk drive 980 may also include removable storage systems, such as removable flash memory.

Bus subsystem 990 provides a mechanism for letting the various components and subsystems of computer 920 communicate with each other as intended. Although bus subsystem 990 is shown schematically as a single bus, alternative embodiments of the bus subsystem may utilize multiple busses.

Some embodiments of the invention may use telecommunications router 935 to route callers or incoming telephone lines (items) to service agents or outgoing telephone lines (resources), or inbound interconnect requests (items) to servers (resources), and the like, based on the final state of the Match Tracker Set. Some embodiments of the invention may use communications interface 950 to route inbound interconnect requests (items) to servers (resources), and the like, based on the final state of the Match Tracker Set. Instruction sets may be provided in computer program product 905 to configure and direct router 935 and interface 950 to perform their routing tasks. Router 950 or direct router 935 may be configured to gather information about a caller, such as the nature of the service requested by the caller as provided information provided by answers on a webpage or by automated questions posed to the caller and answers gathered by telephone key entries (e.g., telephone tree), and this information may be provided to Method 10 to assist in evaluating the match-factor definitions. Information on the location or identity of the caller may be gathered by the automatic number identification (ANI) of the incoming call and similarly provided to Method 10. Some or all embodiments of the invention may store routing information for the Items and Resources in a computer-readable medium, where that information includes information for the routing of at least one Item to one Resource based on the final state of the Match Tracker Set. Instruction sets may be provided in computer program product 905 to perform these storing actions, and to display a representation of the routing information on monitor 910 and/or print the routing information on an output device 930.

Where the performance of a sub-action, action or process of any of the actions, processes, and methods disclosed herein is not predicated on the completion of another sub-action, action, or process, the actions may be performed in any time sequence (e.g., time order) with respect to one another, including simultaneous performance and interleaved performance of various actions. (Interleaved performance may, for example, occur when parts of two or more actions or processes are performed in a mixed fashion.) For example, two or more of the actions of method 10 may be run simultaneously or in an interleaved manner by separate respective processing threads running on system 900. Yet further examples exist, but are not listed here. Accordingly, it may be appreciated that, while the method claims of the present application recite sets of actions, the method claims are not limited to the order of the actions listed in the claim language, but instead cover all of the above possible orderings, including simultaneous and interleaving performance of actions and other possible orderings not explicitly described above, unless otherwise specified by the claim language (such as by explicitly stating that one action precedes or follows another action). The same applies to the instruction sets, codes, and software modules that implement the above sub-actions, action, processes, and methods.

The specification and drawings are to be regarded in an illustrative rather than a restrictive sense. It will be evident that various modifications and changes may be made thereunto without departing from the broader spirit and scope of the invention as set forth in the claims. The scope of the invention should, therefore, be determined not with reference to the above description, but instead should be determined with reference to the pending claims along with their full scope or equivalents.

What is claimed is:

1. A method of routing one or more items to one or more resources, the method comprising:
   generating a set of potential matches between a set of one or more first objects and a set of one or more second objects, each potential match pertaining to exactly one of the first objects and to exactly one of the second objects, one of the sets of first and second objects pertaining to the one or more items, and the other of the sets of first and second objects pertaining to the one or more resources;
   evaluating each potential match with one or more match-factor definitions and generating therefrom a corresponding base score for the potential match;
   assigning the potential matches to a plurality of First-Object groups, each First-Object group corresponding to a first object, each potential match being assigned to the First-Object group to which it pertains as a member of said group;
   sorting the members of each First-Object group by base score, each sorted First-Object group having a top member having the highest base score in the group;
   generating a starting version of a Match Tracker Set from the top members, wherein a top member is included in the starting version of the Match Tracker Set when it is determined that there is no other member of the starting version Match Tracker Set that shares the same second object as said top member;
   generating, by a computer, a Global Conflicts Set from the top members, wherein a top member is included in the Global Conflicts Set when it is determined that there is a member of the starting version of the Match Tracker Set that shares the same second object as said top member;
   generating, by a computer, one or more augmented versions of the Match Tracker Set, each augmented version having a total of base scores that is not less than the total of base scores of the prior version, wherein a member of an augmented version of the Match Tracker Set pertains to the same first object as a member of the Global Conflicts Set, wherein no two members of an augmented version pertain to the same first object and no two members of an augmented version pertain to the same second object; and
   routing the items to the resources based on the matches listed in an augmented version of the Match Tracker Set.

2. The method of claim 1, wherein generating an augmented version of the Match Tracker Set comprises:
   forming a Starting Set comprising a member of the Global Conflicts List and the members of a prior version of the Match Tracker Set;
   generating a plurality of Working Sets from the Starting Set, each Working Set being generated by replacing a member of the Starting Set with a replacement potential match pertaining to the same first object;
   generating a plurality of additional Working Sets from one or more previously-generated Working Sets, each additional Working Set being generated by replacing a member of the previously-generated Working Set with a replacement potential match pertaining to the same first object;
   selecting a Working Set or additional Working Set as the augmented version of the Match Tracker Set, the selected Working Set, the selected Working Set having a total of base scores which is equal to or greater than the total of base scores of the prior version of the Match Tracker Set.

3. The method of claim 2, wherein four Working Sets are generated from a Prior Set, the Prior Set being one of the Starting Set or a previously-generated Working Set, the Prior Set having a member designated at a Conflict Initiator and another member designated as a Conflict Target, a first Working Set comprising the Prior Set with the Conflict Target replaced by the potential match on the same First-Object Group as the Conflict Target that has the next lower base score to that of the Conflict Target, a second Working Set comprising the Prior Set with the Conflict Initiator replaced by the potential match on the same First-Object Group as the Conflict Initiator that has the next lower base score to that of the Conflict Initiator, a third Working Set comprising the Prior Set with the Conflict Target replaced by the potential match on the same First-Object Group as the Conflict Target that has the next lower base score to that of the Conflict Target and that is not in conflict with the other members of the third Working Set, or replaced by a null match if said potential match does not exist, a fourth Working Set comprising the Prior Set with the Conflict Initiator replaced by the potential match on the same First-Object Group as the Conflict Initiator having the next lower base score to that of the Conflict Initiator and that is not in conflict with the other members of the third Working Set, or replaced by a null match if said potential match does not exist.

4. The method of claim 1 wherein generating the starting version of the Match Tracker Set comprises:

assigning the top members from the First-Object groups to a plurality of Second-Object groups, each Second-Object group corresponding to a second object, each top member being assigned to the Second-Object group to which its potential match pertains as a member of said Second-Object group;

for each Second-Object group having two or more members, performing the following actions in sequence:

generating a base score difference for each member of the Second-Object group, the base score difference being the difference between the base score of the member and the base score of a replacement match for the member if such replacement match exists, otherwise being related to the base score of the member, wherein the replacement match is a potential match in the same First-Object group as the member, wherein the replacement match has a lower base score than that of the member and does not conflict with the starting version of the Match Tracker set;

replacing the member of the starting version that is also a member of the Second-Object group with the member of the Second-Object group having the lowest base score difference in the Second-Object group.

5. The method of claim 4, wherein generating the Global Conflicts Set comprises assigning those members from the Second-Object groups that are not in the starting version of the Match Tracker Set to the Global Conflicts Set.

6. The method of claim 1 wherein generating the starting version of the Match Tracker Set comprises:

generating an initial version of a Match Tracker Set from the top members, wherein a top member is included in the initial version of the Match Tracker Set if there is no other member of the initial version Match Tracker Set that shares the same second object as said top member;

assigning the top members from the First-Object groups to a plurality of Second-Object groups, each Second-Object group corresponding to a second object, each top member being assigned to the Second-Object group to which its potential match pertains as a member of said Second-Object group;

for each Second-Object group having only one member, assigning the member to the starting version of the Match Tracker Set;

generating a base score difference for each member of a Second-Object group having two or more members, the base score difference being related to the difference between the base score of the member and the base score of a replacement match for the member if such replacement match exists, otherwise being related to the base score of the member, wherein the replacement match is a potential match in the same First-Object group as the member, wherein the replacement match has a lower base score than that of the member and does not conflict with the initial version of the Match Tracker Set; and for each member of a Second-Object group having two or more members, assigning the member having the lowest base score difference to the starting version of the Match Tracker Set.

7. The method of claim 6, wherein generating the Global Conflicts Set comprises assigning those members from the Second-Object groups that are not in the starting version of the Match Tracker Set to the Global Conflicts Set.

8. The method of claim 1, wherein a match-factor definition determines a value based upon one or more of: an item, information about an item, a resource, information about a resource, one or more external conditions.

9. The method of claim 1, wherein the resources comprise customer-service agents and the items comprise one or more of: incoming phone lines, callers, customers.

10. A computer program product, comprising a non-transitory computer-readable medium having a computer-readable program code embodied therein, said computer-readable program code adapted to be executed to implement a method of routing one or more items to one or more resources, said method comprising:

generating a set of potential matches between a set of one or more first objects and a set of one or more second objects, each potential match pertaining to exactly one of the first objects and to exactly one of the second objects, one of the sets of first and second objects pertaining to the one or more items, and the other of the sets of first and second objects pertaining to the one or more resources;

evaluating each potential match with one or more match-factor definitions and generating therefrom a corresponding base score for the potential match;

assigning the potential matches to a plurality of First-Object groups, each First-Object group corresponding to a first object, each potential match being assigned to the First-Object group to which it pertains as a member of said group;

sorting the members of each First-Object group by base score, each sorted First-Object group having a top member having the highest base score in the group;

generating a starting version of a Match Tracker Set from the top members, wherein a top member is included in the starting version of the Match Tracker Set when it is determined that there is no other member of the starting version Match Tracker Set that shares the same second object as said top member;

generating a Global Conflicts Set from the top members, wherein a top member is included in the Global Conflicts Set when it is determined that there is a member of the starting version of the Match Tracker Set that shares the same second object as said top member;

generating one or more augmented versions of the Match Tracker Set, each augmented version having a total of base scores that is not less than the total of base scores of the prior version, wherein a member of an augmented version of the Match Tracker Set pertains to the same first object as a member of the Global Conflicts Set, wherein no two members of an augmented version pertain to the same first object and no two members of an augmented version pertain to the same second object.

11. The computer-program product of claim 10, wherein the method further comprises storing one or more augmented versions of the Match Tracker Set in a computer readable storage.

12. The computer-program product of claim 10, wherein an augmented version of the Match Tracker Set is operable to route the items to the resources based on the matches listed in said augmented version.

13. The computer-program product of claim 10, wherein generating an augmented version of the Match Tracker Set comprises:
  forming a Starting Set comprising a member of the Global Conflicts List and the members of a prior version of the Match Tracker Set;
  generating a plurality of Working Sets from the Starting Set, each Working Set being generated by replacing a member of the Starting Set with a replacement potential match pertaining to the same first object;
  generating a plurality of additional Working Sets from one or more previously-generated Working Sets, each additional Working Set being generated by replacing a member of the previously-generated Working Set with a replacement potential match pertaining to the same first object;
  selecting a Working Set or additional Working Set as the augmented version of the Match Tracker Set, the selected Working Set, the selected Working Set having a total of base scores which is equal to or greater than the total of base scores of the prior version of the Match Tracker Set.

14. The computer-program product of claim 10, wherein four Working Sets are generated from a Prior Set, the Prior Set being one of the Starting Set or a previously-generated Working Set, the Prior Set having a member designated at a Conflict Initiator and another member designated as a Conflict Target,
  a first Working Set comprising the Prior Set with the Conflict Target replaced by the potential match on the same First-Object Group as the Conflict Target that has the next lower base score to that of the Conflict Target,
  a second Working Set comprising the Prior Set with the Conflict Initiator replaced by the potential match on the same First-Object Group as the Conflict Initiator that has the next lower base score to that of the Conflict Initiator,
  a third Working Set comprising the Prior Set with the Conflict Target replaced by the potential match on the same First-Object Group as the Conflict Target that has the next lower base score to that of the Conflict Target and that is not in conflict with the other members of the third Working Set, or replaced by a null match if said potential match does not exist,
  a fourth Working Set comprising the Prior Set with the Conflict Initiator replaced by the potential match on the same First-Object Group as the Conflict Initiator having the next lower base score to that of the Conflict Initiator and that is not in conflict with the other members of the third Working Set, or replaced by a null match if said potential match does not exist.

15. The computer-program product of claim 10, wherein a match-factor definition determines a value based upon one or more of: an item, information about an item, a resource, information about a resource, one or more external conditions.

16. The computer-program product of claim 10, wherein the resources comprise customer-service agents and the items comprise one or more of: incoming phone lines, callers, customers.

17. The computer-program product of claim 10, wherein generating the starting version of the Match Tracker Set comprises:
  assigning the top members from the First-Object groups to a plurality of Second-Object groups, each Second-Object group corresponding to a second object, each top member being assigned to the Second-Object group to which its potential match pertains as a member of said Second-Object group;
  for each Second-Object group having two or more members, performing the following actions in sequence:
    generating a base score difference for each member of the Second-Object group, the base score difference being the difference between the base score of the member and the base score of a replacement match for the member if such replacement match exists, otherwise being related to the base score of the member, wherein the replacement match is a potential match in the same First-Object group as the member, wherein the replacement match has a lower base score than that of the member and does not conflict with the starting version of the Match Tracker set;
    replacing the member of the starting version that is also a member of the Second-Object group with the member of the Second-Object group having the lowest base score difference in the Second-Object group.

18. A system for routing a plurality of items to a plurality of resources, the system comprising:
  a processor; and
  a memory coupled to the processor, the memory configured to store a plurality of instruction sets which, when executed by the processor, become operational with the processor for routing a plurality of items to a plurality of resources, the memory comprising:
    an instruction set for generating a set of potential matches between a set of one or more first objects and a set of one or more second objects, each potential match pertaining to exactly one of the first objects and to exactly one of the second objects, one of the sets of first and second objects pertaining to the one or more items, and the other of the sets of first and second objects pertaining to the one or more resources;
    an instruction set for evaluating each potential match with one or more match-factor definitions and generating therefrom a corresponding base score for the potential match;
    an instruction set for assigning the potential matches to a plurality of First-Object groups, each First-Object group corresponding to a first object, each potential match being assigned to the First-Object group to which it pertains as a member of said group;

an instruction set for sorting the members of each First-Object group by base score, each sorted First-Object group having a top member having the highest base score in the group;

an instruction set for generating a starting version of a Match Tracker Set from the top members, wherein a top member is included in the starting version of the Match Tracker Set when it is determined that there is no other member of the starting version Match Tracker Set that shares the same second object as said top member;

an instruction set for generating a Global Conflicts Set from the top members, wherein a top member is included in the Global Conflicts Set when it is determined that there is a member of the starting version of the Match Tracker Set that shares the same second object as said top member; and an instruction set for generating one or more augmented versions of the Match Tracker Set, each augmented version having a total of base scores that is not less than the total of base scores of the prior version, wherein a member of an augmented version of the Match Tracker Set pertains to the same first object as a member of the Global Conflicts Set, wherein no two members of an augmented version pertain to the same first object and no two members of an augmented version pertain to the same second object.

19. The system of claim 18, wherein the memory further comprises an instruction set for storing one or more augmented versions of the Match Tracker Set in a computer readable storage.

20. The system of claim 18, wherein an augmented version of the Match Tracker Set is operable to route the items to the resources based on the matches listed in said augmented version.

* * * * *